United States Patent [19]

Carter

[11] 4,191,578

[45] Mar. 4, 1980

[54] RELEASE AGENTS

[75] Inventor: Donald S. Carter, Indianapolis, Ind.

[73] Assignee: Gene Conreaux & Co., Inc., Indianapolis, Ind.

[21] Appl. No.: 847,829

[22] Filed: Nov. 2, 1977

[51] Int. Cl.$^2$ ................................................ B28B 7/36
[52] U.S. Cl. .................................. 106/1.13; 106/1.18; 106/38.22; 106/38.28; 106/287.14; 252/29; 252/30
[58] Field of Search ........... 106/38.22, 38.28, 287 SB, 106/1, 1.13, 1.18, 287.14; 252/26, 28–30

[56] References Cited

U.S. PATENT DOCUMENTS

| | | | |
|---|---|---|---|
| 2,462,242 | 2/1949 | Webb et al. | 106/38.22 |
| 2,666,685 | 1/1954 | Hommel et al. | 106/38.22 |
| 2,743,192 | 4/1956 | White | 106/287 SB |
| 3,191,252 | 6/1965 | Webbere | 106/38.22 |
| 3,196,027 | 7/1965 | White et al. | 106/287 SB |
| 3,634,285 | 1/1972 | Brooks | 106/38.22 |
| 3,872,038 | 3/1975 | Adams et al. | 106/38.22 |

FOREIGN PATENT DOCUMENTS 881666 11/1961 United Kingdom ............. 106/287 SB

*Primary Examiner*—Lorenzo B. Hayes
*Attorney, Agent, or Firm*—Jenkins, Coffey, Hyland, Badger & Conard

[57] ABSTRACT

A release agent for separation of a pattern from a mold cavity or core or the like. The agent consists essentially of an organosiloxane polymer fluid, comminuted aluminum, and a fluorocarbon solvent. Illustratively, the agent may include 0.6% by weight of the organosiloxane polymer fluid. The illustrative organosiloxane polymer has a viscosity of approximately 12,500 centistokes. The illustrative agent includes 3.6% by weight of an aluminum paste including approximately 65–75%, by weight, of finely divided pigment-grade aluminum and 25–35% of mineral spirits vehicle. The fluorocarbon preferably is a non-propellant grade fluorocarbon such as trichlorotrifluoroethane.

15 Claims, No Drawings

RELEASE AGENTS

This invention relates to release agents, and particularly to a release agent suitable for use in, for example, air-set processes for manufacturing molds.

Mold release agents for use in various mold manufacturing processes such as the croning shell mold process are known. One such release agent is described in Hommel et al, U.S. Pat. No. 2,666,685.

In the air-set or no-bake process, the carbon dioxide process, the cold box process, the shell mold process and similar mold manufacturing processes, molding dies consisting of resin-and-sand, or resin-catalyst-and-sand compositions are molded upon patterns or in core boxes, either manually or automatically. The patterns may be constructed from plastic, wood or a metal, typically, aluminum or cast iron. Other materials are also frequently used.

Suitable resins for use in generating such dies in the air-set or no-bake process are phenolic resins, such as phenol-formaldehyde, alkyd resins, and furan resins, such as furan-formaldehyde with suitable catalysts. Such a system may be a two-part system (one binder and one catalyst) to be mixed with sand, or a three-part system (one binder and two catalysts, or two binders and one catalyst) to be mixed with sand. In the carbon dioxide process, typically, a silicate binder will be cured with carbon dioxide gas after mixture with sand. Less frequently, the silicate binder can be cured with some other substance, e.g., an alcohol. In the so-called cold box process, the binder-catalyst system may include, for example, a phenol-formaldehyde cured by an evaporated amine such as triethylamine gas or diethylmethylamine gas. Other binder-catalyst systems useful in the cold box process include a urethane cured by a methylene diphenyl diisocyanate gas, a phenol-urethane binder with an isocyanate hardener, or a furan-urea binder with a phosphoric acid hardener. Since the same pattern or core box typically will be used to generate a very large number of molds, it is important for such release agents to release the pattern or core box quickly and cleanly from the finished molds with a minimum amount of release agent residue or buildup on the pattern.

It is an object of the present invention to provide an improved release agent.

According to the invention, a release agent is provided consisting essentially of an organosiloxane polymer fluid to aid a granular or flaky component in sticking to a pattern or core box, the granular component being a comminuted material from the group consisting of aluminum, copper, brass, bronze, graphite, mica, talc, or mixtures thereof, or other flaky ground mineral or metal, and a vehicle consisting of a chlorinated or fluorocarbon solvent which is essentially non-reactive in, for example, a Friedel-Crafts type reaction, with the comminuted material.

Illustratively the agent includes 0.01% to 8% by weight of the organosiloxane polymer fluid and 1% to 10% by weight of comminuted aluminum and a fluorocarbon.

According to an illustrative embodiment, the percentage by weight of the organosiloxane polymer fluid is 0.6%. The organosiloxane polymer fluid is a lower alkyl or dialkyl siloxane polymer, such as a dimethyl siloxane polymer. The polymer viscosity is in the range of 1,000 to 100,000 centistokes, and illustratively is about 12,500 centistokes.

Further according to an illustrative embodiment, the percentage by weight of comminuted aluminum is in the range of from about 2.2% to about 2.7%. The comminuted aluminum is in the form of an aluminum paste, such as a pigment-grade, chalking-grade, or leafing-grade aluminum in a suitable vehicle forming a paste. The paste includes from about 65% to about 75%, by weight, of the aluminum, and from about 25% to about 35%, by weight, of mineral spirits, such that from about 0.8% to about 1.2% of the weight of the release agent is mineral spirits.

Further according to an illustrative embodiment, the fluorocarbon is a non-propellant grade fluorocarbon, the percentage by weight of the fluorocarbon in the release agent being from about 90% to 98%. In an example, the percentage by weight of the fluorocarbon is approximately 95.9%. In this illustrative embodiment, the fluorocarbon is trichlorotrifluoroethane.

The following example illustrates how this invention may be practiced. This example is illustrative only and is in no way intended to limit the invention.

EXAMPLE

A release agent was prepared in the following manner:

FREON TF, a DU PONT fluorocarbon chemical was combined with DOW CORNING CORPORATION No. 200 silicone fluid and an ALUMINUM COMPANY OF AMERICA aluminum paste, ALCOA paste 6205 in the following proportions: Freon TF, 556 pounds; Alcoa 6205 aluminum paste, 20.5 pounds; Dow Corning No. 200 fluid, 3.5 pounds. The total weight of the composition was 580 pounds. The percentages by weight of each of the constituents were as follows:

FREON TF 95.9%; ALCOA 6205 aluminum paste 3.5%; and DOW CORNING No. 200 fluid 0.6%.

The aluminum paste and silicone fluid were added together in a drum mixer. The fluorocarbon was then added. The constituents were mixed for 10 minutes in a LIGHTNIN ® two prop mixer available from Mixing Equipment Company, Inc. of Rochester, New York. The composition was packaged with the mixer running to aid in maintaining the aluminum in suspension.

The DOW CORNING No. 200 fluid had a viscosity of approximately 12,500 centistokes.

The ALCOA 6205 paste was characterized by a percentage by weight of aluminum pigment of from approximately 65% to approximately 75%. There were traces of other minerals, but the bulk of the paste was from about 25% to about 35% by weight of non-photochemically reactive mineral spirits. The mineral spirits vehicle is miscible in many hydrocarbon solvents.

This mold release agent has excellent release qualities and quite satisfactory prevention of mold release agent buildup on patterns and core boxes when used in mold-manufacturing and molding processes of the air-set, carbon dioxide, cold box, and shell mold types, among others.

What is claimed is:

1. A release agent used to separate patterns and core boxes from foundry molds and cores consisting essentially of a comminuted material selected from the group consisting of aluminum, copper, brass, bronze, graphite, talc and mica, or mixtures thereof, a non-thermosetting organosiloxane polymer fluid to promote adherence of the comminuted material to a pattern or core box, and a solvent vehicle from the group consisting of non-propellant grade chlorocarbon of fluorocarbon solvents which is substantially non-reactive with the comminuted material.

2. The release agent of claim 1 and consisting of essentially of about 0.01% to 10% by weight of the organosiloxane polymer fluid, about 1% to 10% by weight of comminuted aluminum, and a fluorocarbon solvent.

3. The release agent of claim 2 wherein the percentage by weight of the organosiloxane polymer fluid is approximately 0.6%.

4. The release agent of claim 2 wherein the organosiloxane polymer fluid is a lower alkyl or dialkyl siloxane polymer.

5. The release agent of claim 4 wherein the organosiloxane polymer fluid is a dimethyl siloxane polymer.

6. The release agent of claim 2 wherein the viscosity of the organosiloxane polymer fluid is in the range of from about 1,000 to 100,000 centistokes.

7. The release agent of claim 6 wherein the viscosity of the organosiloxane polymer fluid is approximately 12,500 centistokes.

8. The release agent of claim 2 wherein the percentage by weight of the comminuted aluminum is in the range of from about 2.2% to 2.7%.

9. The release agent of claim 8 wherein the comminuted aluminum is in a suitable vehicle.

10. The release agent of claim 9 wherein the vehicle is mineral spirits, the release agent including from about 0.1% to 1.5% by weight of mineral spirits.

11. The release agent of claim 9 wherein the percentage by weight of mineral spirits is from about 0.8% to about 1.3%.

12. The release agent of claim 2 wherein the percentage by weight of the fluorocarbon is from about 90% to 98%.

13. The release agent of claim 12 wherein the percentage by weight of the fluorocarbon is approximately 95.9%.

14. The release agent of claim 13 wherein the fluorocarbon is trichlorotrifluoroethane.

15. A release agent used to separate patterns and core boxes from foundry molds and cores consisting essentially of from about 1% to about 10% by weight comminuted aluminum, from about 0.01% to about 8% by weight of dimethyl siloxane polymer fluid with a viscosity of about 12,500 centistokes to promote adherence of the comminuted material to a pattern or core box, and the balance a non-propellant grade chlorofluorocarbon solvent vehicle which is substantially non-reactive with the comminuted aluminum.

* * * * *